(12) United States Patent
Myers et al.

(10) Patent No.: US 6,399,190 B1
(45) Date of Patent: Jun. 4, 2002

(54) INFRARED-TRANSPARENT STRUCTURE INCLUDING AN ADHERENT, INFRARED-TRANSPARENT POLYMER LAYER

(75) Inventors: James R. Myers; David R. Smith, both of Tucson; William J. Degnan, III, Oro Valley; Lawrence A. Westhoven, Tucson, all of AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 08/690,409

(22) Filed: Jul. 25, 1996

(51) Int. Cl.[7] ................................................ G02B 13/14
(52) U.S. Cl. ..................... 428/335; 359/350; 359/356; 359/359; 428/336; 428/447; 428/450; 428/918
(58) Field of Search ................... 359/350, 356, 359/359; 428/447, 446, 450, 918, 332, 335, 336

(56) References Cited

U.S. PATENT DOCUMENTS 4,754,013 A  6/1988  Antonen ....................... 528/15

FOREIGN PATENT DOCUMENTS

| DE | 34 10 502 A | 3/1985 |
| EP | 0 151 660 A | 8/1985 |
| EP | 0 190 614 A | 8/1986 |
| EP | 0 273 706 A | 7/1988 |
| WO | WO 86 02742 A | 5/1986 |

OTHER PUBLICATIONS

Robert R. Turtle, "Thin optical bonds for infrared uses", *Applied Optics*, vol. 26, No. 20 (Oct. 15, 1987), pp. 4346–4347.
S.F. Pellicori, "Optical bonding agents for IR and UV refracting elements", *SPIE* vol. 1535 Passive Materials for Optical Elements, pp. 48–54 May 1991.
Dow Corning, "Information About Organofunctional Silanes", 3 page brochure (1990) Jun. 14, 1996.
Castall, Inc., "Technical Data Sheet on S–1332 A&B", 2 page brochure, undated Jun. 14, 1996.

*Primary Examiner*—D. S. Nakarani
(74) *Attorney, Agent, or Firm*—David W. Collins; Colin M. Raufer; Glenn H. Lenzen, Jr.

(57) ABSTRACT

An infrared-transparent structure includes a first infrared-transparent element that is transparent to infrared radiation in the 3.6–7 micrometer wavelength range, preferably coated with a zinc-sulfide antireflective coating, and a layer of a solvent-free, infrared-transparent polymer transparent on the first infrared-transparent element. The polymer is formed of an addition-cured silicone, such as addition-cured dimethyl silicone, and a small amount of an adhesion promoter, such as 3-glycidoxypropyltrimethoxysilane. The polymer layer may either be a surface layer, or it may be used as an adhesive between the first infrared-transparent element and a second infrared-transparent element.

22 Claims, 2 Drawing Sheets

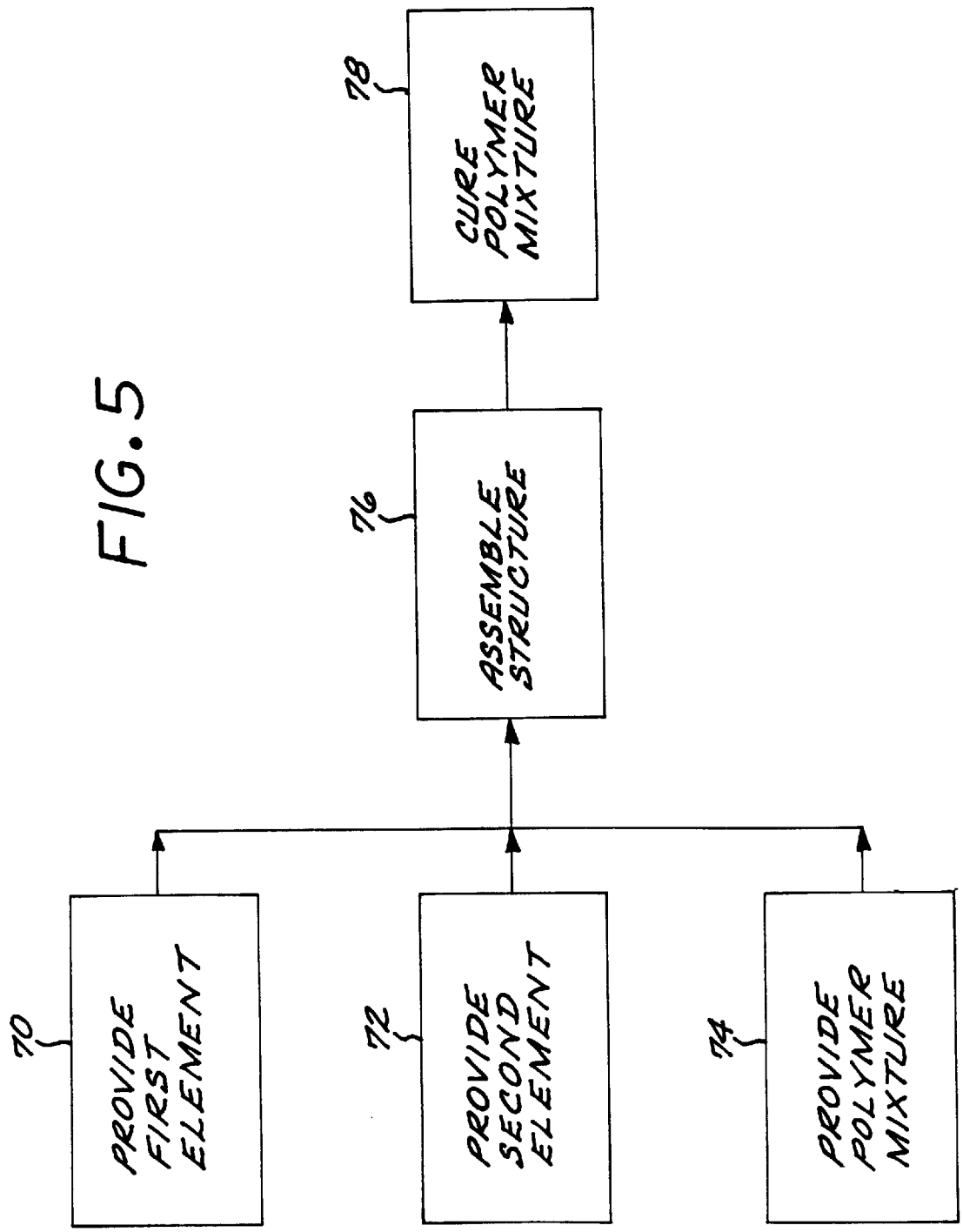

INFRARED-TRANSPARENT STRUCTURE INCLUDING AN ADHERENT, INFRARED-TRANSPARENT POLYMER LAYER

BACKGROUND OF THE INVENTION

This invention relates to infrared-transparent structures, and, more particularly, to such structures having therein a polymeric layer such as an adhesive or a surface coating.

Multicomponent infrared-transparent structures are used in a variety of infrared devices. The structures may be of many types, such as, for example, lenses and windows. Such structures must have a high optical transparency and low distortion in the infrared, and also exhibit required mechanical and physical properties such as strength, resistance to distortion and damage arising from thermal mismatches, good thermal dissipation, and low mass. Additionally, the structures must be readily producible.

One of the applications of most interest for multicomponent infrared-transparent structures is multicomponent lenses such as doublets or triplets. Two, three, or more different optical lenses are joined together in a facing relationship to make a compound lens. For many applications, such a multicomponent lens may be designed to have better optical and mechanical properties than a single-component lens. Multicomponent lenses may be constructed with the lenses joining only at their peripheries, leaving an air gap between the lenses.

In theory, the multiple elements might instead be cemented together with a continuous layer of an adhesive lying between the pairs of components, so that the adhesive lies in the optical path. For such cemented-doublet designs, the adhesive must have high transmissivity and low light distortion in the infrared. It must also adhere well to the lenses which it joins and impart good mechanical properties to the assembly.

Cemented doublets are known for visible-light-transparent lenses, but to date they have not been known for infrared-transparent lenses. The cemented design has optical and mechanical properties which are, in theory, superior to those of air-gap designs, but infrared-transparent polymer adhesives of sufficiently good optical and mechanical quality have not been available to make practical the cemented designs. Accordingly, there is a need for such a polymeric material that may be used as a cement or adhesive between infrared-transparent optical components. Although the problem has been described in respect to the problem of multicomponent lenses, it is also of concern for other applications such as infrared-transparent films and surface layers.

SUMMARY OF THE INVENTION

The present invention provides an infrared-transparent structure having excellent infrared transmission properties, particularly in the 3.6–7 micrometer wavelength range, and also excellent mechanical and physical properties. The approach is applicable to infrared-transparent multicomponent structures and also to infrared-transparent articles with surface films and layers. The present approach promotes good mechanical stability of joined optics, optical designs with greater power, improved thermal dissipation, reduced thermal stresses, and reduced distortion due to temperature changes. Total internal reflection angles are reduced, providing higher performance optical designs. Additionally, optical alignment is improved, system mass is reduced for many cases, and there is improved producibility.

In accordance with the invention, an infrared-transparent structure comprises a first infrared-transparent element having a first face, most preferably where the element is transparent to infrared energy in the wavelength range of from about 3.6 to about 7 micrometers (the "3.6–7 micrometer wavelength range"). The structure further includes a layer of a solvent-free polymer material disposed on the first face of the first infrared-transparent element. For the preferred case where the element is transparent in the 3.6–7 micrometer wavelength range, the polymer material is characterized by an infrared transparency wherein a 10-micrometer thickness of the polymer material is at least 95 percent transparent (exclusive of Fresnel losses) to infrared energy in the 3.6–7 micrometer wavelength range.

In a preferred case, the polymer comprises an addition-cured silicone such as addition-cured dimethyl silicone, diphenyl silicone, or methylphenyl silicone, and also comprises an adhesion promoter. The adhesion promoter is preferably 3-glycidoxypropyltrimethoxysilane. The adhesion promoter is present in an effective amount, preferably from about 1 to about 4 percent by weight of the total of the polymer and the adhesion promoter. The layer of polymer is from about 0.0002 to about 0.002 inches thick.

In one embodiment that is of particular interest, the structure further includes a second infrared-transparent element having a second face disposed in facing relationship to the first face of the first-infrared-transparent element. The polymer is disposed between and contacts the first face and the second face and serves as an adhesive or cement holding the first and second elements together. This infrared optical doublet forms a compound lens that has excellent optical, mechanical, and physical properties. The structure may be extended further with the bonding of additional lenses, to form triplets and even-more-complex lenses.

The present approach is particularly useful where the first face of the first infrared-transparent element is coated with an antireflective coating such as one including a zinc sulfide top layer, and where the second face of the second element, where present, is similarly provided with an antireflective coating. The use of the adhesion promoter serves to achieve good bonding between the polymer layer and the antireflective coating.

The most preferred polymer layer composition, addition-cured dimethyl silicone and 3-glycidoxypropyltrimethoxysilane in an amount of from about 1 to about 4 percent by weight of the total, is particularly useful because it has no solvent to form distorting bubbles or the like in the mixture if trapped, produces no volatile byproducts during curing, and has low outgassing during and after curing. It has relatively low viscosity so that thin films may be formed, and it may be vacuum degassed to remove entrapped gasses. The addition-curing operation produces no byproducts which must be removed from the thin interfacial layer which, if not removed, result in distortions in the layer. The cured polymer has a low elastic modulus so that it can accommodate thermal expansion mismatches between joined components or when serving as a film.

The polymer is prepared by mixing the constituents, degassing as necessary, and applying the mixture as a thin layer. The layer is used at a free surface or as an adhesive to join another element to the first. The polymer is thereafter cured, preferably by heat curing.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is a block diagram of a method for preparing the infrared-transparent composite structure of FIG. 2.

DETAILED DESCRIPTION OF THE INVENTION

Figure 1:
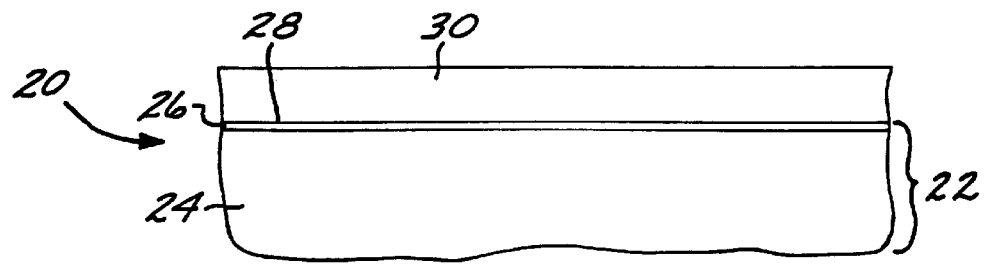
FIG. 1 is a schematic sectional view of an infrared-transparent structure having a first element and a polymer layer thereon.

FIG. 1 depicts one preferred embodiment of an infrared-transparent structure 20 including a first infrared-transparent element 22 that is transparent to infrared energy in the wavelength range of 3.6–7 micrometers. The element 22 is formed as a first infrared-transparent substrate 24 having an optional but preferred first infrared-transparent antireflective coating 26 thereon. The first (exposed) face 28 of the element 22 is therefore the surface of the coating 26. The substrate 24 is preferably silicon or germanium, both of which have high transparency in the 3.6–7 micrometer range. The antireflective coating 26 is preferably a multilayer structure having zinc sulfide as a top surface layer remote from the substrate 24. Such antireflective coatings 26 are well known in the art.

A layer 30 of a cured infrared-transparent polymer material is disposed in contact with the first face 28. The polymer material is the polymerization product of an addition-curable polymer precursor such as a silicone precursor. Preferably, the polymer material includes addition-cured dimethyl silicone and an adhesion promoter. Other addition-curable polymer precursors such as diphenyl silicone or methylphenyl silicone may also be used. The layer 30 is preferably from about 0.0002 to about 0.002 inches thick. The addition-cured dimethyl silicone has a chemical structure of

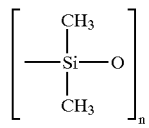

The preferred use of an addition-curable polymer precursor is to be distinguished from the use of a condensation-curable polymer precursor. The addition-curable polymer precursor does not produce reaction products during curing, as does the condensation-curable polymer precursor. Such reaction products of a condensation curing reaction would be trapped within the layer 30 for the case of the bonding of an optical doublet, leading to optical distortions. No such problem arises for an addition-curable polymer precursor.

The adhesion promoter is generally an alkoxysilane. An effective adhesion promoter is 3-glycidoxypropyltrimethoxysilane, which has a chemical structure of

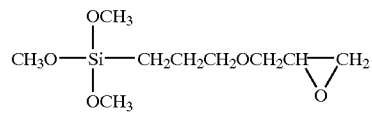

No substantial amounts of solvents, fillers, or other such agents are present in the polymer formulation or the final cured product.

An adhesion promoter is used rather than a primer. A primer is a material that is applied to a surface prior to contacting it with another formulation, to improve adherence. An adhesion promoter is mixed with the formulation to be applied. The adhesion promoter was used in the present formulation because the proper application of a primer at the surfaces of optical assemblies may be difficult in a production operation and may introduce optical and mechanical variability into the final product. The adhesion promoter is mixed into the polymer formulation in a specified amount so as to avoid such potential manufacturing difficulties and variability.

The addition-curable dimethyl silicone is available commercially as Castall S-1332 from Castall, Inc., and the 3-glycidoxypropyltrimethoxysilane is available commercially as Z-6040 from Dow Corning or as G-6720 from United Chemical Technologies, among others. The refractive index of Castall S-1332 is 1.410 at the wavelength of the sodium D line, 0.589 micrometers, and the refractive index of Z-6040 is 1.428 at this same wavelength.

The preferred polymer formulation has important advantages over other possible polymer formulations, in the present application. Studies were performed with solvent-containing polymers, such as methyl phenyl silicone having about 20 percent toluene solvent. This formulation could not be successfully degassed due to bubble formation as the solvent evaporated, so that bubbles were present in a final cured polymer. While such bubbles could be acceptable in some applications, they are not acceptable where optical transmission and absence of distortion are important. When an infrared optical doublet was prepared using this material, the polymer was grainy and not acceptable. The mechanical strength was also low. From this work, it was concluded that the polymer must be free of solvents, which cannot be readily removed from a thin layer. Further studies were performed with epoxy resins having no solvents but various types of catalysts. The infrared transmission of these films was low, in the 92–93 percent range for a 10 micrometer thick film, and consequently unacceptable. Further studies were performed using a cyanoacrylate polymer with no solvent. This material was unacceptable because it cured so rapidly that it was difficult to align the lenses of an optical doublet and due to its higher modulus. A condensation-cured silicone polymer was tried and found to be inoperable for bonding two lenses together to form a doublet, because the volatile products of the condensation reaction could not escape from a thin film between two transparent elements.

The preferred polymer formulation of the invention has a combination of properties that render it highly suitable for the present application. It has an infrared transmission of more than 99 percent (exclusive of Fresnel losses) for a 10 micrometer thick film, over a temperature range of –54° C. to +100° C., and it has a known, consistent refractive index. It has no solvent and may be degassed to remove entrapped air. It has a viscosity that permits assembly of the elements and removal of air bubbles within the layer prior to curing. The formulation cures in thin-film form in an acceptable time, and does not outgas during curing. The curing is accomplished by an addition mechanism that does not require moisture from the air, which would have to diffuse into the bond line to accomplish curing. It has good adhesion to infrared-transparent materials such as silicon and germanium, as well as to materials used in infrared-transparent antireflective layers such as zinc sulfide. No primer is required, and there is a low health hazard for workers who perform the assembly of optical components.

Figure 2:
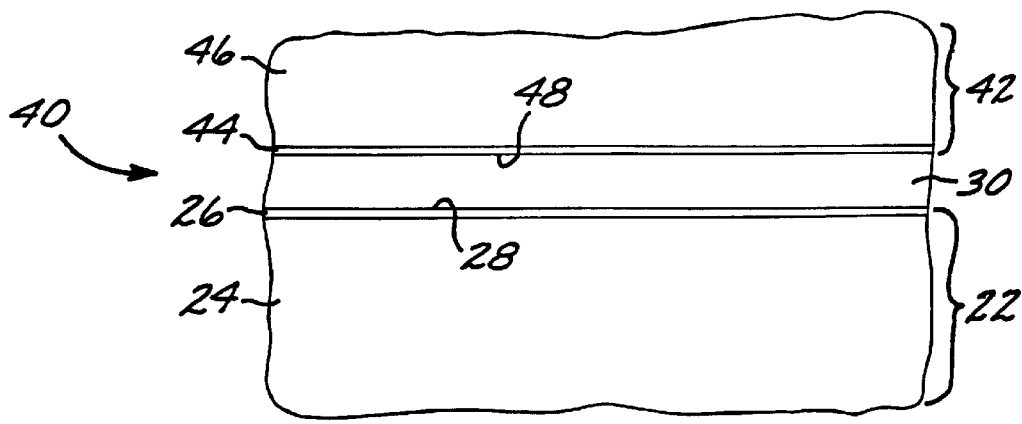
FIG. 2 is a schematic sectional view of an infrared-transparent structure having a first element joined to a second element by a polymer layer.

FIG. 2 illustrates another embodiment, here a structure 40 having the same elements as the structure 20, except with the addition of a second infrared-transparent element 42 having a second infrared-transparent coating 44 on a second substrate 46. The second infrared-transparent coating 44 defines a second face 48 that faces the first face 28. The layer 30 lies between the elements 22 and 42 and their facing faces 28 and 48. Here, the layer 30 serves as an adhesive or bonding agent between the two elements 22 and 42. The elements 22 and 42, and their antireflective coatings, where used, must be transparent to infrared energy but need not have the same compositions or physical dimensions.

Figure 3:
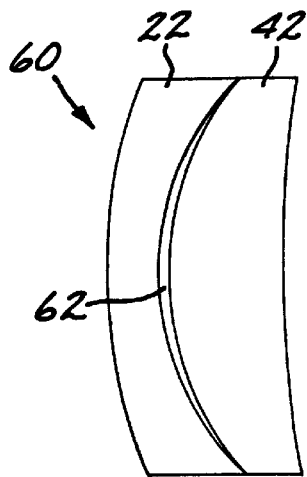
FIG. 3 is a schematic sectional view of an air-gap infrared doublet.
Figure 4:
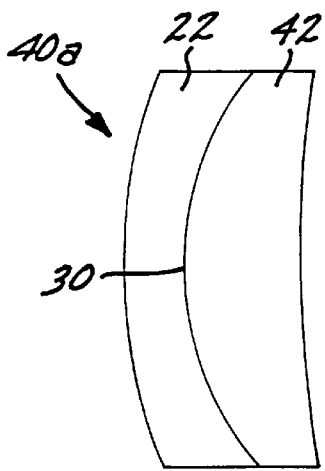
FIG. 4 is a schematic sectional view of an adhesively bonded infrared doublet.

In FIGS. 1 and 2, the infrared-transparent elements 22 and 42 are illustrated in general form, without specifying their further physical characteristics or function. FIGS. 3 and 4 present a specific application of such elements 22 and 42, and of the present invention. FIG. 3 is an infrared-transparent doublet 60 made with the infrared-transparent elements 22 and 42 having lens shapes. In the doublet 60 of FIG. 3, there is an air gap 62 between the two elements 22 and 42. The approach of FIG. 3 is not within the scope of the invention, but is an approach that could be followed in the event that no operable infrared-transparent polymer formulation were available.

FIG. 4, on the other hand, depicts an infrared-transparent doublet 40a, which is one embodiment of the structure 40 of FIG. 2. The faces 28 and 48 are curved in a conforming manner in accordance with the function of the structure. The elements 22 and 42 are preferably coated with an antireflective coating on their facing faces and their remote faces, but the antireflective coatings are not further indicated in FIG. 4 for clarity of illustration. The polymer layer 30 lies between the two elements 22 and 42 and bonds them together. For many applications, the cemented doublet 40a has optical and mechanical performance superior to that of the air-gap doublet 60 of FIG. 3.

FIG. 5 is a block flow diagram of a preferred method for preparing the structure 40 (or 40a). The first element 22 and the second element 42 are provided, numerals 70 and 72, respectively. The elements 22 and 42 having compositions, shapes, and coatings appropriate to their function. The polymer mixture as described previously is provided, numeral 74. The preferred mixing approach is to mix 10 parts of Castall S-1332 resin with 1 part of its recommended silane curing agent, and to mix this mixture with from 1 to about 4 percent by weight (of the total) of the Z-6040 adhesion promoter. The components are mixed together in a cup, and the mixture is degassed to remove bubbles formed during mixing. The preferred degassing is 3–4 minutes in a vacuum of less than 1 millimeter mercury, or until bubbling ceases.

The structure is assembled, numeral 76. An excess of the mixture is applied to the center of one of the elements 22 or 42. The second element is applied so that the mixture is captured between the two elements 22 and 42. The mixture is distributed by moving the two lenses gently in a circular pattern, which also tends to force any remaining bubbles to the periphery. The distribution is continued until the mixture begins to extrude from the edges of the assembly. A weight of from about 1 to about 5 pounds per square inch of area of the assembly is applied to extrude additional mixture from between the elements 22 and 42 and to establish a desired thickness of the layer 30, preferably about 0.0002 to about 0.002 inches. The load is evenly distributed to avoid mechanical distortion of the assembly. The elements 22 and 42 are thereafter aligned optically using appropriate tooling, which is possible because the mixture remains uncured for a period of time that permits alignment.

The mixture is cured, numeral 78, to form the cured polymer layer 30 by heating the assembly to 85° C. for a minimum time of 4 hours. This curing cycle does not impair the infrared transmission performance of either the bonded elements or the polymer, and in fact enhances the infrared performance.

The following examples illustrate aspects of the invention, but should not be interpreted as limiting the scope of the invention in any respect. Prior to undertaking these studies, unacceptable candidate components were eliminated from consideration as described previously.

EXAMPLE 1

Specimens of Castall S-1332 and Z-6040 were mixed in various proportions according to the procedures discussed previously and used to form bonds to substrates of zinc sulfide, Cleartran (a processed zinc sulfide material), and lenses coated with an antireflective coating having a zinc sulfide top layer which contacts the polymer material. The results for the various materials bonded together were substantially the same. The bonded samples were dots of the mixture on the various substrates.

A series of formulations with 0, 0.5, 1.0, 2.0, and 3.0 percent by weight of the Z-6040, balance Castall S-1332 were prepared and used to form dot specimens against the substrate surfaces. The dots were mechanically probed with a tool to qualitatively assess their adhesion. Dot specimens with 0, 0.5 or 1.0 percent by weight of Z-6040 were removed easily by adhesive failure, while those with 2.0 and 3.0 percent by weight exhibited good adherence to the substrate and instead failed by cohesive failure. It was concluded that the adhesion promoter should be minimally present in an amount of from about 1 to about 2 percent of the mixture of polymer and adhesion promoter. To minimize the addition of the adherence promoter, a formulation of 2.0 percent by weight of Z-6040, balance Castall S-1332 was selected as preferred.

EXAMPLE 2

Mechanical test specimens were prepared and tested. One-inch diameter disks of zinc sulfide were bonded together with unmodified Castall S-1332 and the preferred formulation of 2 weight percent Z-6040, balance Castall S-1332. The disks bonded together with the unmodified Castall S-1332 fell apart as they were being mounted into the testing machine. Quantitative strength data could not be obtained, but the shear strength was estimated at less than 10 pounds per square inch (psi). The disks bonded together with the preferred formulation exhibited a failure shear strength of 148 psi. The failure mode showed significant cohesive failure, indicating a strong adhesive bond between the bonded elements.

EXAMPLE 3

Specimens of zinc sulfide were bonded to borosilicate glass using the approach of the invention, and also unmodified Castall S-1332, for use in thermal cycling testing. The borosilicate glass is not an infrared-transmissive material of interest for components, but it is transparent in the visible to enable visual inspection of the bondline of cycled specimens. The thermal expansion coefficient difference between zinc sulfide and borosilicate glass, 4.2 ppm (parts per million) per ° C., is on the order of, and in fact slightly greater than, the thermal expansion coefficient difference between silicon and germanium (which are commonly used for doublets), 3.3 ppm per ° C.

The specimens were cured 16 hours at 85° C. and had thicknesses of the layer 30 of 15±5 micrometers. The specimen bonded with unmodified Castall S-1332 had a small number of bubbles on the outer periphery after curing, while the formulation according to the invention had no bubbles.

The two specimens were thermally cycled between −54° C. and +90° C., with a heating/cooling rate of 10° C. per minute, for 100 cycles, with inspection every 20 cycles. After 100 cycles, the specimen bonded by the preferred formulation had no evidence of bubbles, delamination, or other anomaly. The specimen bonded with Castall S-1332 exhibited growth of the existing bubbles to form incipient delaminations, but no new indications of failure.

EXAMPLE 4

The infrared transmission for the unmodified Castall S-1332 and for the preferred formulation (except with 3 percent by weight of Z-6040) were measured. Relatively thick films of 185 micrometers thickness were used in order to get measurable results. From these measurements, a 10 micrometer thick layer of the preferred formulation was estimated to have infrared transmission of 99.2 percent (exclusive of Fresnel losses) in the 3.6–7 micrometer wavelength range.

EXAMPLE 5

The use of the preferred formulation of the polymer mixture to bond infrared-transmissive components to other structures made of cyanate ester, Invar 36, calcium fluoride with antireflective coating, zinc selenide with antireflective coating, or titanium was studied. The use of the Z-6040 neither improves nor degrades such bonding strengths. The bonding strengths are good in all cases, with the exception of titanium. For bonding to titanium, the use of a primer improves the bond strength to an acceptable level.

The ability of the preferred formulation to achieve bonds of the infrared-transmissive components to various non-transmissive structures permits a single formulation to be used for a wide variety of bonding applications in typical infrared systems. This simplifies bonding procedures in an industrial setting.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An infrared-transparent structure, comprising:
    a first infrared-transparent element having a first face; and
    a layer of a solvent-free polymer material disposed on the first face of the first infrared-transparent element, wherein the solvent-free polymer material is not a solvent-free epoxy and is not a solvent-free cyanoacrylate.

2. The structure of claim 1, wherein the polymer material is characterized by an infrared transparency wherein a 10-micrometer thickness of the polymer material is at least 95 percent transparent to infrared energy in the 3.6–7 micrometer wavelength range.

3. The structure of claim 1, wherein the polymer material comprises an addition-cured silicone and an adhesion promoter.

4. The structure of claim 3, wherein the addition-cured silicone is addition-cured dimethyl silicone.

5. The structure of claim 3, wherein the adhesion promoter is an alkoxysilane.

6. The structure of claim 3, wherein the adhesion promoter is 3-glycidoxypropyltrimethoxysilane.

7. The structure of claim 3, wherein the mixture comprises from about 1 to about 4 percent by weight 3-glycidoxypropyltrimethoxysilane, balance dimethyl silicone.

8. The structure of claim 1, wherein the first infrared-transparent element comprises:
    a first infrared-transparent substrate having a first substrate face, and
    a first infrared-transparent antireflective coating at the first substrate face, and
wherein the layer of the polymer material is applied overlying and in contact with the first infrared-transparent antireflective coating.

9. The structure of claim 8, wherein the first infrared-transparent antireflective coating comprises a zinc sulfide top layer.

10. The structure of claim 1, further including
    a second infrared-transparent element having a second face disposed in facing relationship to the first face of the first-infrared-transparent element, and
wherein the polymer material is disposed between and contacting the first face and the second face.

11. The structure of claim 10, wherein the first infrared-transparent element comprises:
    the first infrared-transparent substrate having the first face, and
    a first infrared-transparent antireflective coating at the first face, and wherein the layer of the polymer material overlies and is in contact with the first infrared-transparent antireflective coating, and
wherein the second infrared-transparent element comprises:
    the second infrared-transparent substrate having the second face, and
    a second infrared-transparent antireflective coating at the second face, and wherein the layer of the polymer material overlies and is in contact with the second infrared-transparent antireflective coating,
whereby the polymer material contacts and joins the first and second infrared-transparent substrates at their respective antireflective coatings.

12. The structure of claim 1, wherein the polymer material comprises an addition cured polymer.

13. An infrared-transparent structure, comprising:
    a first infrared-transparent element having a first face, the first infrared-transparent element being transparent to infrared energy in the 3.6–7 micrometer wavelength range;
    a second infrared-transparent element having a second face, the second infrared-transparent element being transparent to infrared energy in the 3.6–7 micrometer wavelength range;
    a layer of a solvent-free polymer material disposed between and contacting the first face of the first infrared-transparent element and the second face of the second infrared-transparent element, the polymer material being characterized by an infrared transparency wherein a 10-micrometer thickness of the polymer material is at least 95 percent transparent to infrared energy in the 3.6–7 micrometer wavelength range, wherein the solvent-free polymer material is not a solvent-free epoxy and is not a solvent-free cyanoacrylate.

14. The structure of claim 13, wherein the first face has a first antireflective coating thereon and the second face has a second antireflective coating thereon.

15. The structure of claim 13, wherein the first antireflective coating and the second antireflective coating each comprise a top layer of zinc sulfide.

16. The structure of claim 13, wherein the polymer material comprises an addition-cured silicone.

17. The structure of claim 13, wherein the polymer material comprises a mixture of an addition-cured silicone and an adhesion promoter.

18. The structure of claim 13, wherein the polymer material comprises from about 1 to about 4 percent by weight 3-glycidoxypropyltrimethoxysilane, balance addition-cured dimethyl silicone.

19. The structure of claim 13, wherein the layer of polymer material has a thickness of from about 0.0002 to about 0.002 inches.

20. The structure of claim 13, wherein the first infrared-transparent element and the second infrared-transparent element are each made of a material selected from the group consisting of silicon and germanium.

21. The structure of claim 13, wherein the polymer material comprises an addition cured polymer.

22. An infrared-transparent structure, comprising:

a first infrared-transparent element transparent to infrared energy in the 3.6–7 micrometer wavelength range, the first infrared-transparent element having a first face with a first antireflective coating thereon;

a second infrared-transparent element transparent to infrared energy in the 3.6–7 micrometer wavelength range, the second infrared-transparent element having a second face with a second antireflective coating thereon;

a layer of a solvent-free polymer material disposed between and contacting the first face and the second face, the polymer material comprising from about 1 to about 4 percent by weight 3-glycidoxypropyltrimethoxysilane, balance addition-cured dimethyl silicone.

\* \* \* \* \*